US012700221B2

(12) United States Patent      (10) Patent No.:      US 12,700,221 B2
    Yazawa                          (45) Date of Patent:      Aug. 4, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tomonori Yazawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 18/356,640

(22) Filed: Jul. 21, 2023

(65) Prior Publication Data

US 2024/0037921 A1      Feb. 1, 2024

(30) Foreign Application Priority Data

Jul. 28, 2022      (JP) ................................. 2022-120579

(51) Int. Cl.
     *G06V 10/774*      (2022.01)
     *G06V 10/82*       (2022.01)
(52) U.S. Cl.
     CPC ............ *G06V 10/774* (2022.01); *G06V 10/82* (2022.01)
(58) Field of Classification Search
     None
     See application file for complete search history.

(56) References Cited

U.S. PATENT DOCUMENTS

2023/0259818 A1*      8/2023      Amada ................. G06N 20/00
                                                            706/12

OTHER PUBLICATIONS

Jiankang Deng, et al.; ArcFace: Additive Angular Margin Loss for Deep Face Recognition; arXiv: 1801.07698; Journal of LA TEX Class Files, vol. 14, No. 8, Aug. 2015; pp. 1-17.

* cited by examiner

*Primary Examiner* — Leon Flores
(74) *Attorney, Agent, or Firm* — Canon U.S.A., Inc. IP Division

(57)      ABSTRACT

An information processing apparatus includes one or more memories, and one or more processors that, when executing instructions stored in the one or more memories, function as the following units: an acquisition unit configured to acquire learning data including data and a label indicating a category of the data, a base holding unit configured to hold a base for generating a representative vector in the category, a learning unit configured to learn a parameter related to generation of the representative vector based on the acquired learning data, and a first generation unit configured to generate the representative vector based on the parameter and the base.

17 Claims, 7 Drawing Sheets

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

In recent years, techniques for processing captured images of an object to extract useful information have been proposed. In particular, techniques using a multi-level neural network called deep network (or also called deep neural network or deep learning) have been actively studied.

Techniques for determining the identity of an object by transforming images into features and comparing the features by a deep network (for example, deep metric learning) have been also actively studied. Jiankang Deng, Jia Guo, Niannan Xue, and Stefanos Zafeiriou (hereinafter, Jiankang Deng et al.) propose in "ArcFace: Additive Angular Margin Loss for Deep Face Recognition. arXiv: 1801.07698" that a deep network is trained as a person class determinator to determine the identity of a person by using extracted feature parts (for example, identifying a person by a class assigned to a person's name).

The method proposed by Jiankang Deng et al., however, requires a representative vector representing each class for determining a person class. That is, the method proposed by Jiankang Deng et al. requires a number of representative vectors corresponding to the number of classes for determining the person class, and as a result, the memory usage is increased.

SUMMARY

The present disclosure is directed to reducing the memory usage in the processing of a deep network using representative vectors.

According to an aspect of the present disclosure, an information processing apparatus includes one or more memories, and one or more processors that, when executing instructions stored in the one or more memories, function as the following units: an acquisition unit configured to acquire learning data including data and a label indicating a category of the data, a base holding unit configured to hold a base for generating a representative vector in the category, a learning unit configured to learn a parameter related to generation of the representative vector based on the acquired learning data, and a first generation unit configured to generate the representative vector based on the parameter and the base.

Further features of various embodiments will become apparent from the following description of exemplary embodiments with reference to the attached drawings.

DESCRIPTION OF THE EMBODIMENTS

Exemplary embodiments of the present disclosure will be described with reference to the drawings. Configurations of the exemplary embodiments described below are mere examples, and some embodiments of the present disclosure are not limited to the illustrated configurations.

In a first exemplary embodiment, representative vectors to be used in the learning of a deep network are generated by holding bases including base vectors and weights for linearly combining the base vectors and then linearly combining the base vectors based on the weights at the time of learning. In this manner, holding the bases smaller in total memory size (data amount) than the representative vectors and generating the representative vectors from the bases makes it possible to reduce the memory usage in the process of a deep network using the representative vectors as compared to the memory usage in a case where the representative vectors themselves in the individual classes are held.

Figure 1:
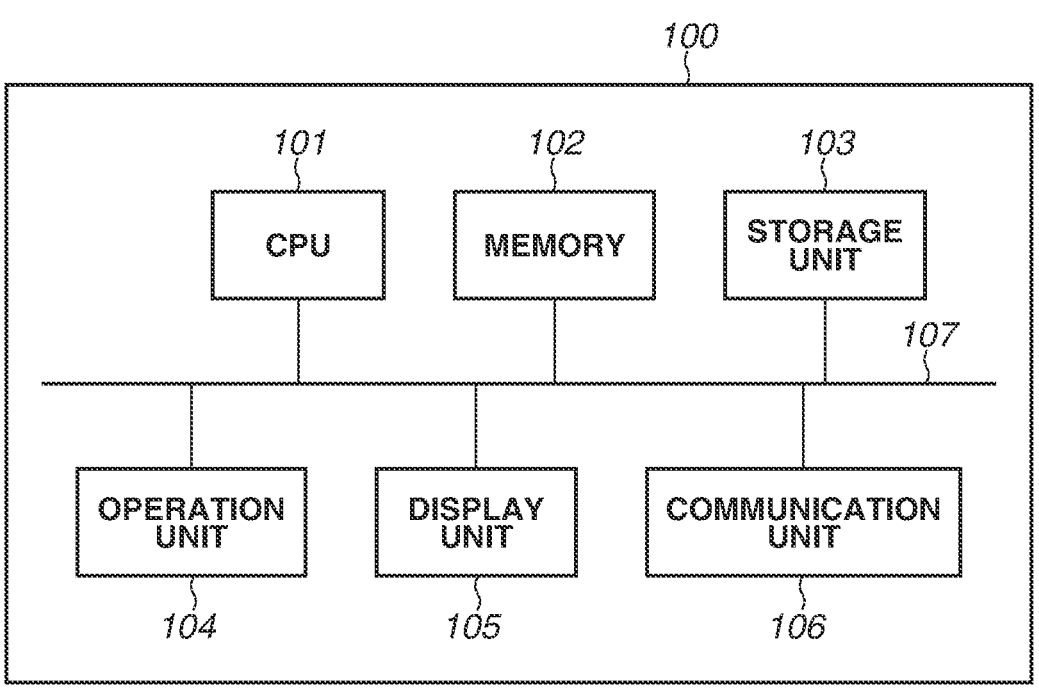
FIG. 1 is a diagram illustrating a hardware configuration example of an information processing apparatus.

FIG. 1 is a diagram illustrating a hardware configuration example of an information processing apparatus 100 in the present exemplary embodiment. The information processing apparatus 100 includes a central processing unit (CPU) 101, a memory 102, a storage unit 103, an operation unit 104, a display unit 105, a communication unit 106, and a system bus 107. The CPU 101, the memory 102, the storage unit 103, the operation unit 104, the display unit 105, and the communication unit 106 are communicably connected to each other via the system bus 107. The information processing apparatus 100 according to the present exemplary embodiment may further include other components.

The CPU 101 controls the entire information processing apparatus 100. The CPU 101 controls the operations of the functional units connected via the system bus 107, for example. The memory 102 stores the data and programs used by the CPU 101 in performing processing. The memory 102 functions as the main memory, work area, and the like, of the CPU 101. When the CPU 101 executes processing based on the programs stored in the memory 102, the configuration of the information processing apparatus 100 illustrated in FIG. 2 described below and the processing in the flowchart of FIG. 3 described below are implemented.

The storage unit 103 stores various types of data necessary for the CPU 101 to perform processing according to the programs, for example. The storage unit 103 stores various types of data obtained by the CPU 101 performing the processing according to the programs, for example. The data, programs, and the like, used by the CPU 101 in performing the processing may be stored in the storage unit 103. The operation unit 104 has an operation member, such as a mouse or buttons, to input user operations into the information processing apparatus 100. The display unit 105 has a display member, such as a liquid crystal display, to display the results of the processing performed by the CPU 101. The operation unit 104 and the display unit 105 may be integrally formed as a display member having a touch panel function, for example. The communication unit 106 connects the information processing apparatus 100 to a network to control communications with other apparatuses.

Figure 2:
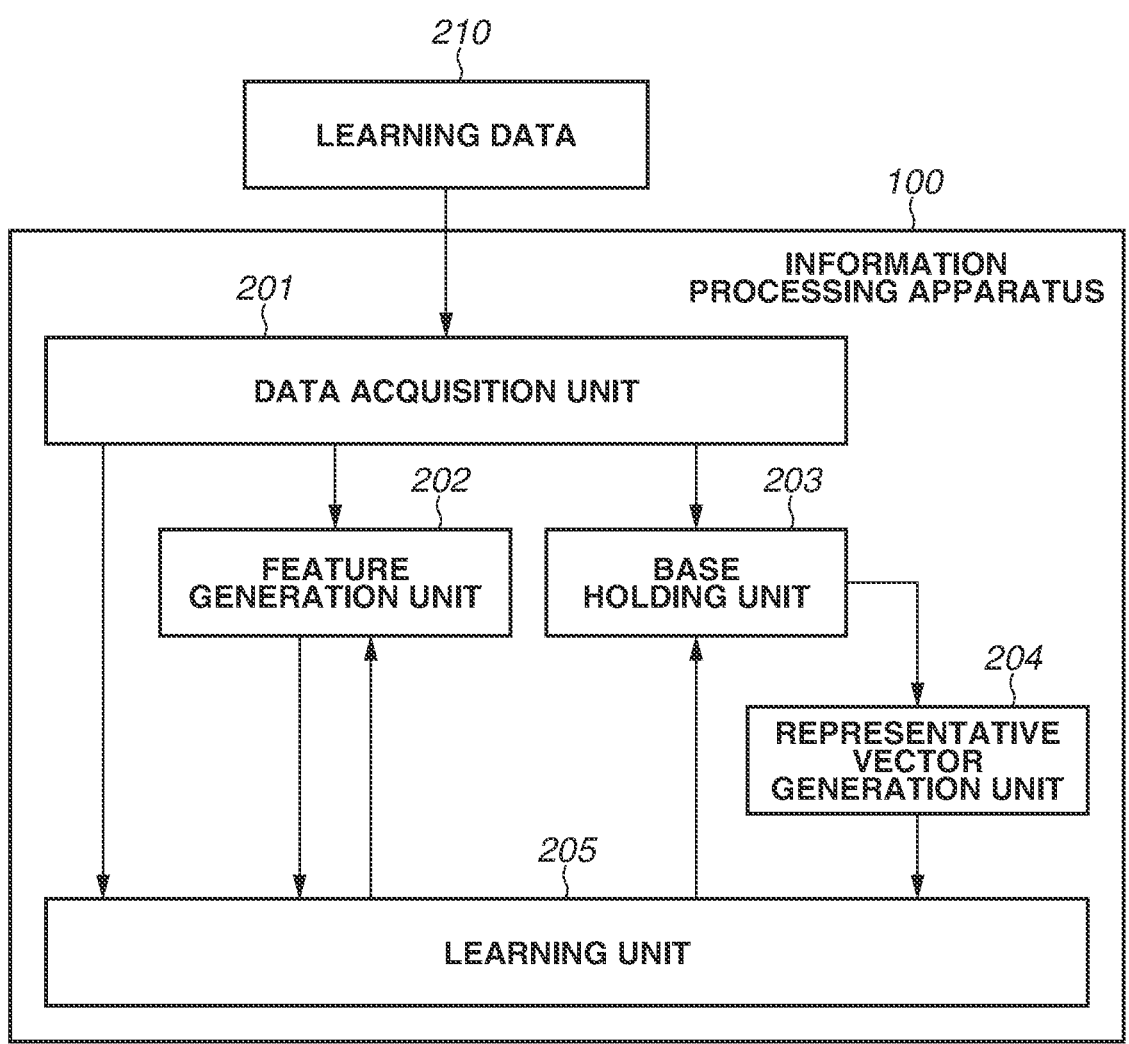
FIG. 2 is a diagram illustrating a configuration example of the information processing apparatus.

FIG. 2 is a block diagram illustrating a configuration example of the information processing apparatus 100. The information processing apparatus 100 includes a data acquisition unit 201, a feature generation unit 202, a base holding unit 203, a representative vector generation unit 204, and a learning unit 205.

The data acquisition unit 201 acquires learning data 210. The learning data 210 is data that includes a plurality of images (data) in a field of an identity determination target and labels representing categories (classes) to which the images belong. In the present exemplary embodiment, as an example, the target of identity determination is persons' faces. In order to identify the persons' faces, the learning data 210 includes the images of the persons' faces and the labels of information with which the persons in the images can be uniquely identified (for example, the persons' names). The acquired learning data 210 is used for learning by a deep network included in the feature generation unit 202 (also called deep neural network). The learning by the deep network here is to adjust parameters in the deep network in such a way that the deep network produces an appropriate output when an input is given to the deep network.

The feature generation unit 202 receives an input of images and outputs feature vectors. In the present exemplary embodiment, the feature generation unit 202 receives an input of images (data) included in the learning data 210 and outputs vectors having a predetermined number of dimensions (for example, 512 dimensions) as feature vectors. The feature generation unit 202 uses a deep network to transform images into feature vectors. In the present exemplary embodiment, the feature generation unit 202 uses a deep network of ResNet50 to generate feature vectors as discussed by Jiankang Deng et al., for example. The deep network used for generating the feature vectors is not limited to ResNet50 and may be a deep network of another structure (architecture).

The base holding unit 203 holds bases that are parameters for generating representative vectors. The representative vectors are vectors used for identity determination, and are used to identify the labels at the time of learning, for example. In the present exemplary embodiment, the inner product of the representative vector corresponding to each label and the feature vector generated by the feature generation unit 202 are used to calculate the degree of similarity, and the degree of similarity is used as an index for the progress of learning at the time of learning. In the present exemplary embodiment, the representative vectors are generated by linearly combining the base vectors. Accordingly, the bases held by the base holding unit 203 include the base vectors and the weights for linearly combining the base vectors.

The representative vector generation unit 204 receives an input of the bases held by the base holding unit 203 and outputs the generated representative vectors. The representative vector generation unit 204 generates the representative vectors based on the parameters learned by the learning unit 205 and the bases held by the base holding unit 203. In the present exemplary embodiment, the representative vector generation unit 204 generates the representative vectors by linearly combining the base vectors based on the weights for linearly combining the base vectors.

The learning unit 205 learns the parameters related to the generation of the representative vectors based on the learning data 210. The learning unit 205 receives an input of the feature vectors, the representative vectors, and the labels included in the learning data 210, and learns the deep network included in the feature generation unit 202 and the bases included in the base holding unit 203 as parameters. The learning method may be a method commonly used for the learning of a deep network, and the parameters are optimized so as to minimize errors caused by back-propagation, for example.

Figure 3:
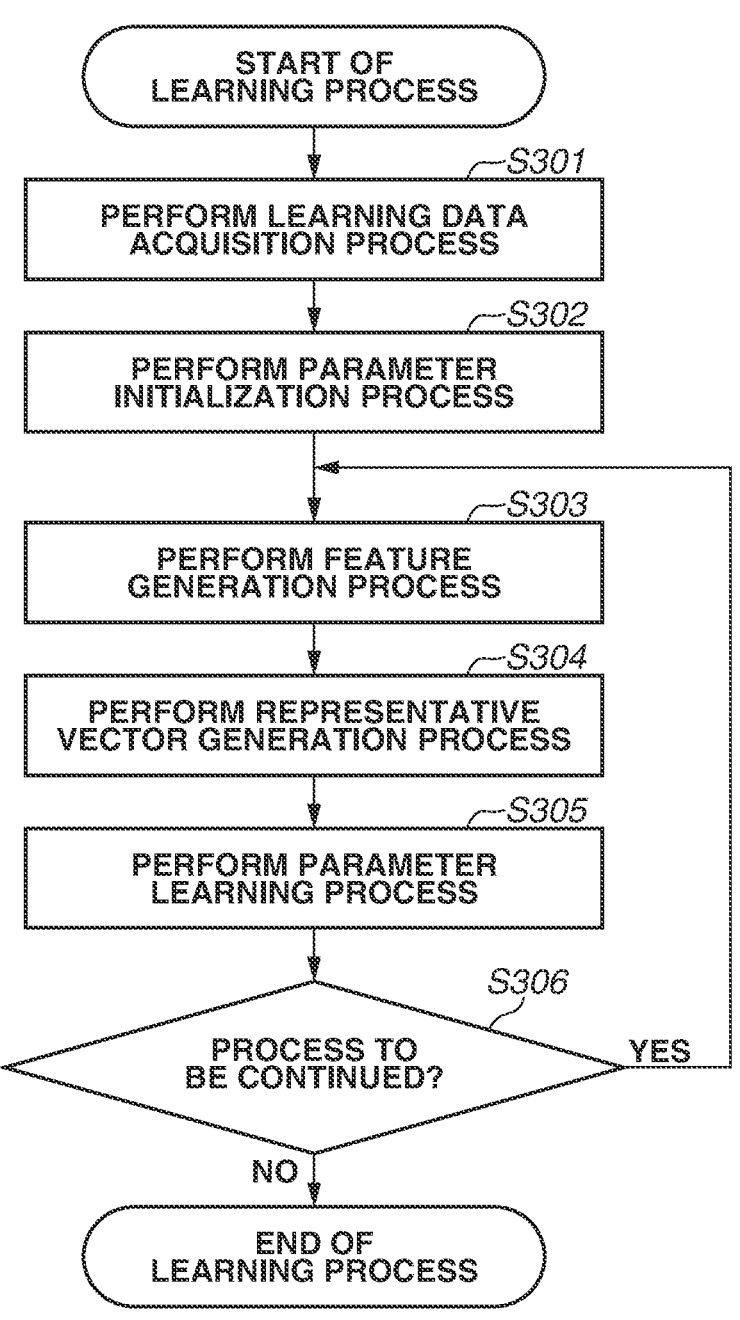
FIG. 3 is a flowchart of a learning process by the information processing apparatus.
Figure 4:
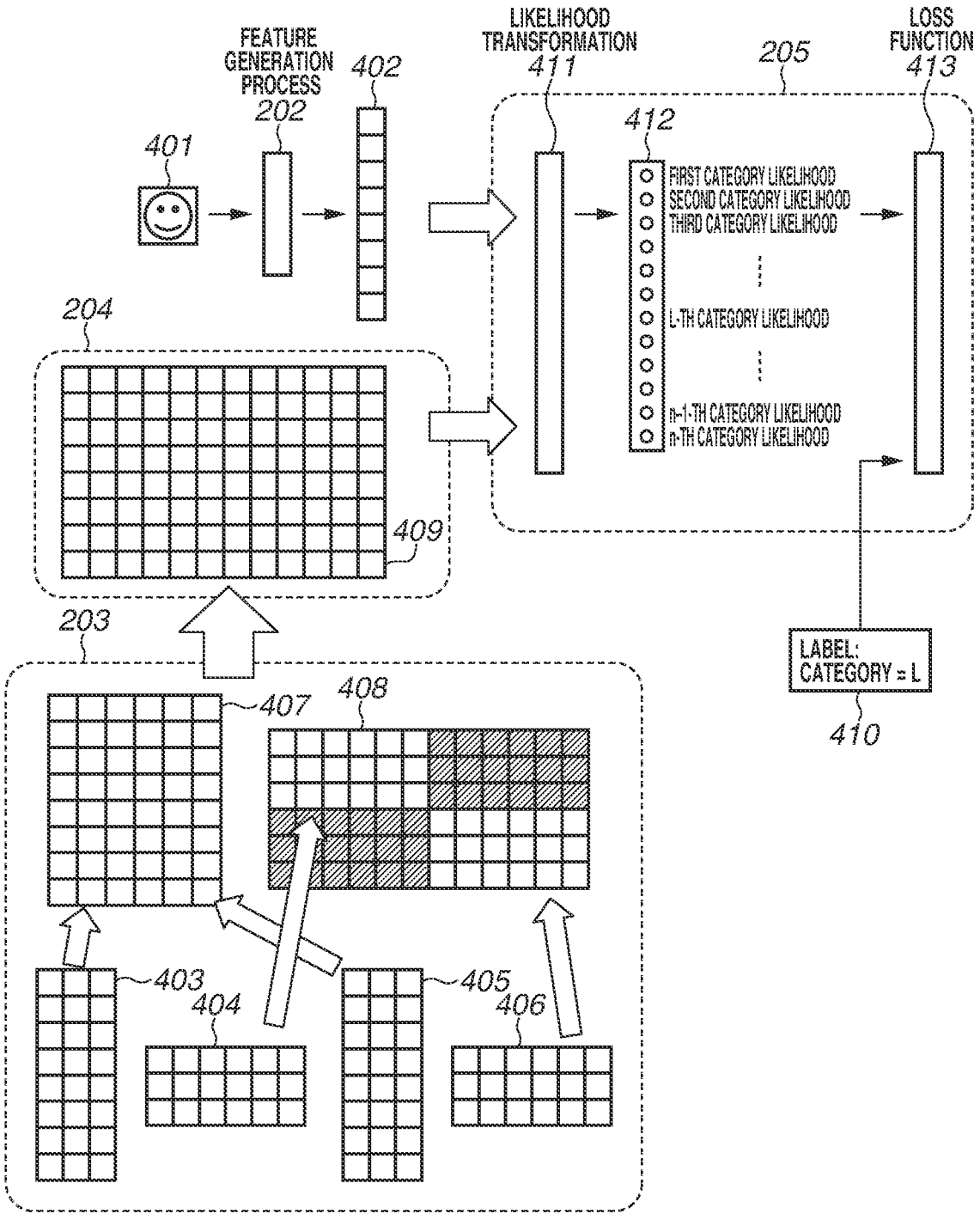
FIG. 4 is a diagram describing an example of the learning process.

FIG. 3 is a flowchart of a learning process by the information processing apparatus 100. FIG. 4 is a diagram describing an example of the learning process in the present exemplary embodiment.

In step S301, the data acquisition unit 201 performs a learning data acquisition process to acquire the input learning data 210. The learning data 210 includes images and labels indicating the categories (classes) to which the images belong as described above. In the example of the present exemplary embodiment, the images are images of persons' faces and the labels are information with which the persons seen in the images can be uniquely identified (for example, the persons' names).

In step S302, the learning unit 205 performs a parameter initialization process. In the parameter initialization process, the learning unit 205 initializes the parameters included in the feature generation unit 202 and the base holding unit 203. The parameters here are parameters in the deep network included in the feature generation unit 202, and the base vectors and weights for linearly combining the base vectors held as the bases by the base holding unit 203. In the present exemplary embodiment, as an example, elements of the parameters are initialized at random in accordance with an independent standard normal distribution.

In step S303, the feature generation unit 202 performs a feature generation process. The feature generation unit 202 receives an input of the images included in the learning data 210 acquired by the data acquisition unit 201 and outputs feature vectors having a predetermined number of dimensions obtained by transforming the images. For example, as illustrated in FIG. 4, the feature generation unit 202 performs a feature generation process on an input image 401 and outputs a feature vector 402 corresponding to the image 401. In the example of the present exemplary embodiment, the feature generation unit 202 has a deep network of ResNet50 for generation of feature vectors, inputs an image into the deep network of ResNet50, and outputs the obtained vector as a feature vector. The present example is a learning process of the deep network, and thus information necessary for parameter correction, such as input values and output values of each level processing, is held in advance.

In step S304, the representative vector generation unit 204 performs a representative vector generation process. The representative vector generation unit 204 generates representative vectors based on the bases held by the base holding unit 203. For example, the representative vector generation unit 204 generates a representative vector 409 by linearly combining base vectors (for example, a constituent element 407 illustrated in FIG. 4) held by the base holding unit 203 based on weights (for example, a constituent element 408 illustrated in FIG. 4).

A vector v obtained by linearly combining m base vectors can be expressed by Equation 1 below. In Equation 1, $a_{v,i}$ is the weight of linear combination for the vector v, and $e_i$ is the base vector.

$$v = \sum_{i=1}^{m} a_{v,i} e_i \qquad \text{(Equation 1)}$$

The j-th element of the vector v obtained by linear combination can be expressed by Equation 2 as follows:

$$v_j = \sum\nolimits_{i=1}^{m} a_{v,i}(e_i)_j \qquad \text{(Equation 2)}$$

This can be regarded as an inner product of a lateral vector having the j-th component $(e_i)_j$ of the base vector as an element and a vertical vector having the weight $a_{v,i}$ of linear combination as an element.

A matrix E representing the base vector is expressed by Equation 3 as follows:

$$E_{ji}=(e_i)_j \qquad \text{(Equation 3)}$$

A matrix A representing the weight of linear combination is expressed by Equation 4 as follows for the k-th representative vector:

$$A_{ik}=a_{v(k),i} \qquad \text{(Equation 4)}$$

A matrix product EA is expressed by Equation 5 as follows:

$$(EA)_{jk} = \sum\nolimits_{i=1}^{m} a_{v(k),i}(e_i)_j \qquad \text{(Equation 5)}$$

Accordingly, each element of the matrix product EA expressed by Equation 5 is similar in form to that in Equation 2, and each column of the matrix product EA constitutes a representative vector.

In a case where the number of dimensions of the base vector and the representative vector is designated as d, the matrix E is a matrix of d rows and m columns (for example, the constituent element 407 illustrated in FIG. 4). In a case where the number of generated representative vectors is n, the matrix A is a matrix of m rows and n columns (for example, the constituent element 408 illustrated in FIG. 4). The number n of the representative vectors is equal to the number of persons given as labels. The total memory size (data amount) related to the bases is (d×m)+(n×m)=(d+n)× m. In contrast to this, the total memory size (data amount) of the representative vectors is (d×n). Accordingly, in a case where the value m is sufficiently smaller than the number of representative vectors (the number of labels) (m<<n), it is possible to reduce the memory usage necessary for learning by generating representative vectors from the bases with a small total memory size, rather than by holding the representative vectors themselves.

In the present exemplary embodiment, the weights of linear combination are provided in the form of holding a plurality of weights for linear combination of three base vectors. For example, the form of constituent elements 403, 404, 405, and 406 illustrated in FIG. 4 are applied. The constituent element 403 schematically represents a matrix representing three base vectors (first base vector group). The constituent element 404 schematically represents a matrix representing the weight for linearly combining the three base vectors (the first base vector group). Similarly, the constituent element 405 schematically represents a matrix representing three base vectors (a second base vector group), and the constituent element 406 schematically represents a matrix representing the weight for linearly combining the three base vectors (the second base vector group).

A matrix indicating all the weights of linear combination (the constituent element 408 illustrated in FIG. 4) includes the components of weights of linear combination (the constituent elements 404 and 406 illustrated in FIG. 4). The components (the hatched left lower part and right upper part in the constituent element 408 illustrated in FIG. 4 are applied) other than the components of weights of linear combination (the constituent elements 404 and 406 illustrated in FIG. 4) have a value of 0. Thus, the value of these components does not need to be held. That is, the configuration of the bases as in the present exemplary embodiment further decreases the total memory size of values held and further reduces the memory usage. For example, according to Jiankang Deng et al., the representative vectors are held in a matrix of d rows and n columns. In contrast, in the present exemplary embodiment, this can be substituted by holding only a part of the matrix of d rows and m columns representing the base vectors and a part of the matrix of m rows and n columns representing the weights of linear combination. For this reason, it is possible to decrease the total memory size of the values held and reduce the memory usage.

In such a form of the present exemplary embodiment, it is necessary to determine in advance the labels indicating categories corresponding to three base vectors. The labels are determined at random in the parameter initialization process in step S302. In the example described above, a plurality of weights of linear combination for three base vectors is held. However, the number of base vectors is not limited to three, and a plurality of weights of linear combination for three or more base vectors may be held to similarly further reduce the memory usage.

Figure 5A:
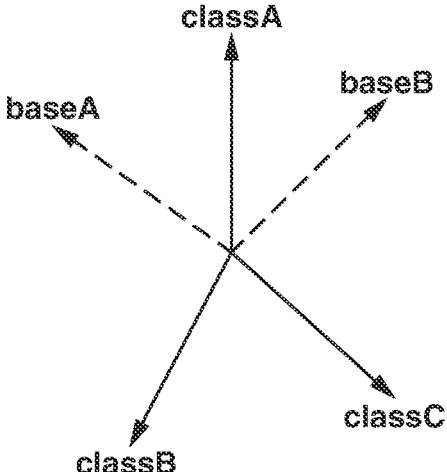
FIGS. 5A and 5B are diagrams illustrating examples of base vectors and representative vectors.
Figure 5B:
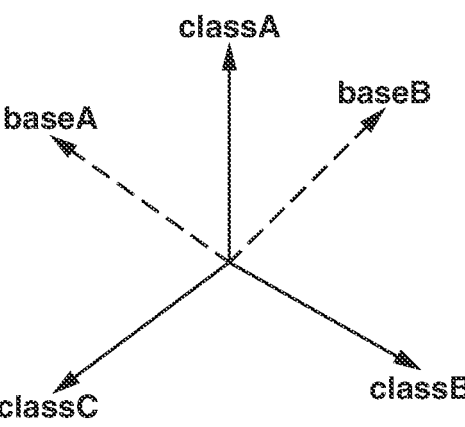

In a case where representative vectors are generated from two base vectors by linear combination, the representative vectors are unlikely to be sufficiently optimized. FIGS. 5A and 5B illustrate examples of generating representative vectors from two base vectors. In the examples of FIGS. 5A and 5B, base A and base B are base vectors, and class A, class B, and class C are representative vectors. The positional relationship among the representative vectors are different between the example in FIG. 5A and the example in FIG. 5B. Under such a restriction, it is difficult to effect a transition to an appropriate state in a learning step described below unless the representative vectors and the categories are appropriately associated with each other. On the other hand, in a case where representative vectors are generated from three or more base vectors as in the present exemplary embodiment, the range of possible transition of the representative vectors is three or more dimensions, so that the learning progresses while the positional relationship among the representative vectors makes a transition to an appropriate state. That is, no restriction is imposed on the positional relationship related to optimization of the representative vectors, which enables higher-accuracy optimization of the representative vectors.

In step S305, the learning unit 205 performs a parameter learning process to learn the parameters possessed by the feature generation unit 202 and the base holding unit 203. The parameters learned in the parameter learning process are the parameters of the deep network possessed by the feature generation unit 202 and the bases (the base vectors and the weights of linear combination) possessed by the base holding unit 203. As illustrated in FIG. 4, the learning unit 205 learns the parameters based on the feature vector 402 output by the feature generation unit 202, the representative vector 409 output by the representative vector generation unit 204, and a label 410 of the learning data 210 corresponding to the feature vector. In learning the parameters, the learning unit 205 determines the amounts of correction to the parameters based on the feature vector 402, the representative vector

409, and the label 410. In learning the parameters, the learning unit 205 determines the amounts of correction to the parameters by a back-propagation process while regarding, as one deep network, the deep network possessed by the feature generation unit 202, the bases possessed by the base holding unit 203, and the representative vector generation unit 204. The value of a loss used in the back-propagation process is calculated from the feature vectors and the representative vectors. In the present exemplary embodiment, the ArcFace loss function discussed by Jiankang Deng et al. is used as an example. That is, a value L of a loss is expressed by Equation 6 as follows:

$$L = -\frac{1}{N}\sum_{i=1}^{N} \log\frac{\exp(s\ \cos(\theta_{yi} + m))}{\exp(s\ \cos(\theta_{yi} + m)) + \sum_{j\neq yi} \exp(s\ \cos\ \theta_j)} \qquad \text{(Equation 6)}$$

In Equation 6, N is the number of feature vectors. In the deep network, the parameters are corrected by a mini-batch process, and in this example, N=512 as discussed by Jiankang Deng et al. A cosine function is applied to the angle formed by the feature vector and the representative vector. The representative vectors used correspond to the index $\theta$. The sign yi indicates the label corresponding to the i-th feature vector. That is, the inner product with the representative vector corresponding to the label yi is taken. The signs s and m are parameters called scale and margin, respectively, and in this case, s=64, m=0.5 as discussed by Jiankang Deng et al. Therefore, in a likelihood transformation 411 illustrated in FIG. 4, calculations equivalent to cosign function are performed by the inner product of the feature vector and the representative vector, likelihood 412 of each label is output, and the value represented by a loss function 413 in (Equation 6) is calculated using the likelihood. The respective values of the parameters N, s, and m are mere examples and the values are not limited to these examples. Any values can be appropriately set to the parameters. The loss function used is not limited to the ArcFace loss function and any other loss function may be used.

In step S306, the learning unit 205 determines whether to continue the learning process. The learning unit 205 determines whether to continue the learning process by determining whether steps S303 to S305 described above have been repeatedly performed a predetermined number of times. In this example, as discussed by Jiankang Deng et al., the parameter learning process is repeated 180,000 times. The number of times the parameter learning process has been repeated is not limited to this number and can be arbitrarily set. In a case where the number of times steps S303 to S305 have been repeated has not reached a predetermined number of times (NO in step S306), the learning unit 205 determines that the process is to be continued, and the process returns to step S303. On the other hand, in a case where steps S303 to S305 have been repeatedly performed a predetermined number of times (YES in step S306), the learning unit 205 determines that the process is completed, and the learning process illustrated in FIG. 3 is ended.

As described above, the information processing apparatus 100 in the present exemplary embodiment holds the bases smaller in total memory size than the representative vectors, and generates representative vectors from the held bases in the learning of the deep network possessed by the feature generation unit 202. In this manner, because the representative vectors are generated from the bases smaller in the total memory size, it is possible to reduce the total memory size as compared to the case of holding the representative vectors themselves, and reduce the memory usage necessary for the learning of the deep network.

A second exemplary embodiment will be described. In the first exemplary embodiment, based on the base vectors and the weights of linear combination held as the bases by the base holding unit 203, a plurality of representative vectors is generated by linearly combining the base vectors to decrease the total memory size and reduce the memory usage. It is, however, possible to generate representative vectors from base vectors by imposing a stronger restriction on linear combination without having to hold the weights of linear combination.

For example, a restriction is imposed on the generation of representative vectors such that the vector obtained by multiplying a base vector by one time and the vector obtained by multiplying a base vector by −1 time are representative vectors. That is, a restriction is imposed on the generation of representative vectors such that base vectors and vectors sign-inverted from the base vectors are representative vectors. Under the restriction described above, the representative vectors in n classes (categories) can be expressed by a matrix of d rows and n/2 columns representing base vectors and a matrix of n/2 rows and n columns representing the weights for linearly combining base vectors, for example. As in the first exemplary embodiment, d is the number of dimensions of the base vectors and the representative vectors, and n is the number of categories to which the image belongs. In a case where the representative vectors are obtained by multiplying the base vectors by one time and −1 time, the values of the matrix representing the weights related to linear combination of the base vectors are obvious. Thus, the values related to the weights of linear combination do not need to be held and only the matrix of d rows and n/2 columns representing the base vectors needs to be held.

A configuration of the information processing apparatus 100 and a flow of a learning process performed by the information processing apparatus 100 in the second exemplary embodiment are basically similar to those in the first exemplary embodiment described above with reference to FIGS. 1 to 3, and thus description thereof will be omitted. In the second exemplary embodiment, the base vector corresponds to two labels, a label corresponding to the one-time vector and a label corresponding to the −1-time vector. The association of the labels with the base vector may be determined on the basis of the initial degree of similarity between the categories represented by the labels, for example. In the second exemplary embodiment, the base holding unit 203 has a deep network having undergone a certain degree of learning in advance, which is a network of ResNet50 having undergone learning according to the method discussed by Jiankang Deng et al., for example. The base holding unit 203 uses the initial degrees of similarity calculated by the deep network to assign two labels with a low degree of similarity to the same base vector.

Specifically, the base holding unit 203 transforms all the images of the learning data into feature vectors and calculates an average vector for each label. The base holding unit 203 associates a pair of labels of which the inner product of the average vectors is lowest, that is, a set of two labels of which the inner product of the average vectors is lowest, with the first base vector. Then, the base holding unit 203 removes the two associated labels, and similarly associates a pair of labels of which the inner product of the average vectors is lowest with the second base vector. This process is repeated to assign two labels to each base vector such that the degree of similarity is lower than in the case of assigning the labels at random. In the case of assigning labels with a low degree of similarity to the base vector, the value of the inner product of the unsimilar labels is fixed in the low state. A distance space representing such degrees of similarity is similar to that in learning without the above-described restriction (for example, the learning method as in the first exemplary embodiment). Accordingly, even under the restriction, it is likely to obtain learning results close to those in the case without the restriction.

Figure 6:
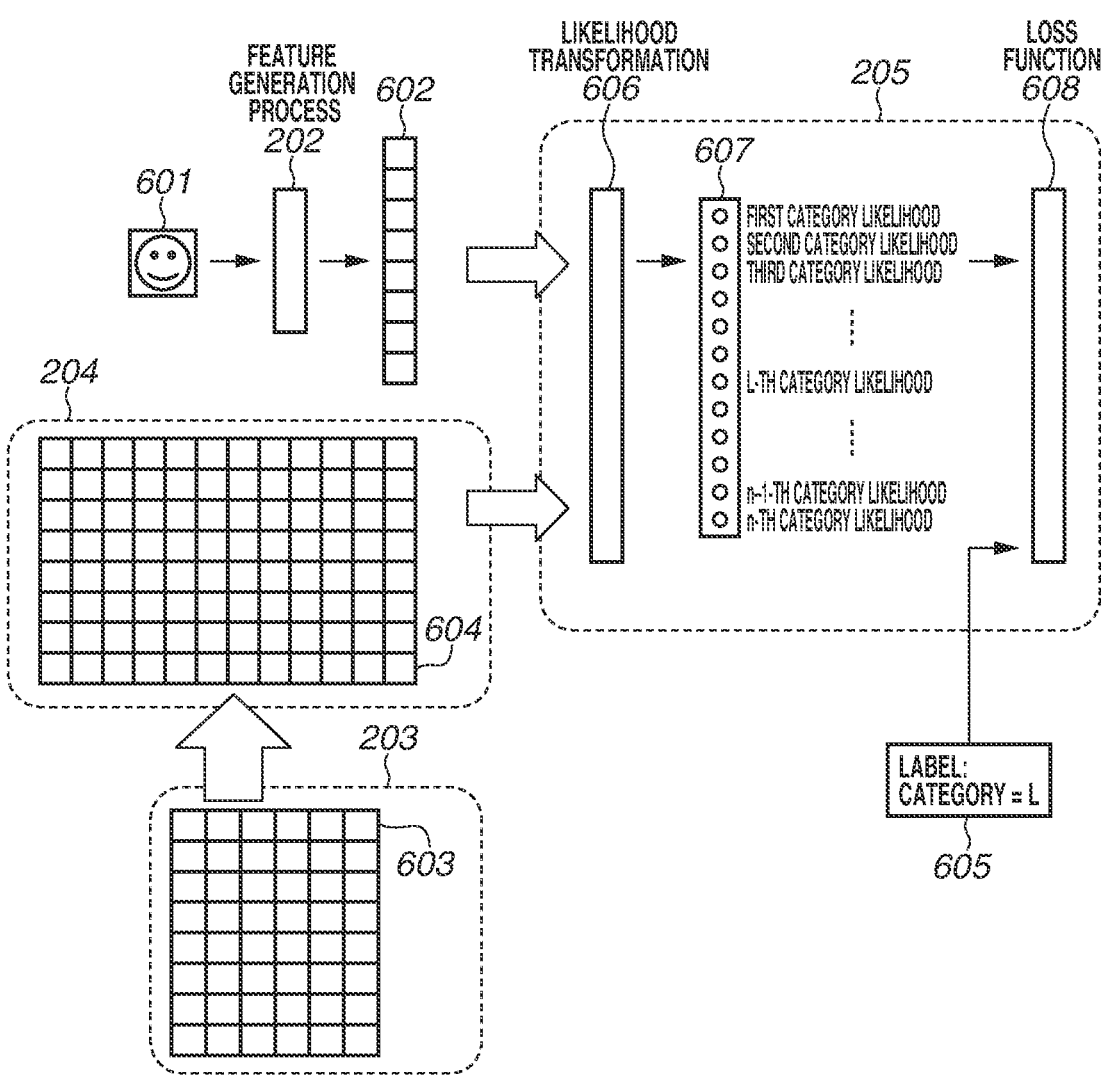
FIG. 6 is a diagram describing another example of the learning process.

FIG. 6 is a diagram describing an example of a learning process in the second exemplary embodiment. Constituent elements 601 to 602 and 605 to 608 illustrated in FIG. 6 respectively correspond to the constituent elements 401 to 402 and 410 to 413 illustrated in FIG. 4. In the learning process in the second exemplary embodiment, the base holding unit 203 holds only a matrix (parameters) 603 representing a base vector, and the representative vector generation unit 204 multiplies the base vector by one time and −1 time to generate representative vectors 604.

In the second exemplary embodiment, in the parameter learning process, the learning unit 205 can calculate and process the representative vectors from the base vector in the process of a loss function 608. As an example, in the case of using the ArcFace loss function discussed by Jiankang Deng et al. as in the first exemplary embodiment, a value L of a loss is expressed by Equation 7 as follows:

$$-\frac{1}{N}\sum_{i=1}^{N}\log\frac{\exp(s\ dir(y_i)\ \cos(\theta_{v(yi)}+m))}{\exp(s\ dir(y_i)\ \cos(\theta_{v(yi)}+m))+} \qquad \text{(Equation 7)}$$
$$\exp(s\ dir(y_i)\ \cos\ \theta_{v(yi)})+$$
$$\Sigma_{j\neq yi}\Sigma_{c\in\{1,-1\}}\exp(cs\ \cos\ \theta_{v(j)})$$

In Equation 7, v is the function for acquiring a base vector corresponding to a label, and dir is the function for determining whether to multiply the base vector by one time or −1 time when the label is acquired. For example, in the case of v(yi), the base vector corresponding to a label yi is acquired, and in the case of dir(yi), it is determined whether to multiply the base vector by one time or −1 time with the label yi. The other indexes are similar to those in the ArcFace loss function in Equation 6 described above.

As stated above, in the second exemplary embodiment, it is possible to generate the representative vectors from the base vectors without holding the weight for linearly combining the base vectors. This makes it possible to save the memory necessary for holding the weights for linear combination, decrease the total memory size of the bases, and further reduce the memory usage necessary for the learning of the deep network.

A third exemplary embodiment will be described. In the first and second exemplary embodiments, the representative vectors are generated from the base vectors by transformation based on linear combination. Alternatively, the representative vectors may be generated from the base vectors using transformation other than linear transformation. In the third exemplary embodiment, a base holding unit 203 holds base vectors as bases, and a representative vector generation unit 204 performs approximate processing of orthogonal transformation to generate representative vectors.

A configuration of an information processing apparatus 100 and a flow of a learning process performed by the information processing apparatus 100 in the third exemplary embodiment are basically similar to those in the first exemplary embodiment described with reference to FIGS. 1 to 3, and thus description thereof will be omitted. However, in the third exemplary embodiment, in the generation of representative vectors in step S304 in the learning process, the representative vector generation unit 204 generates representative vectors from base vectors held by the base holding unit 203 in a transformation process different from the linear combination of base vectors.

Figure 7:
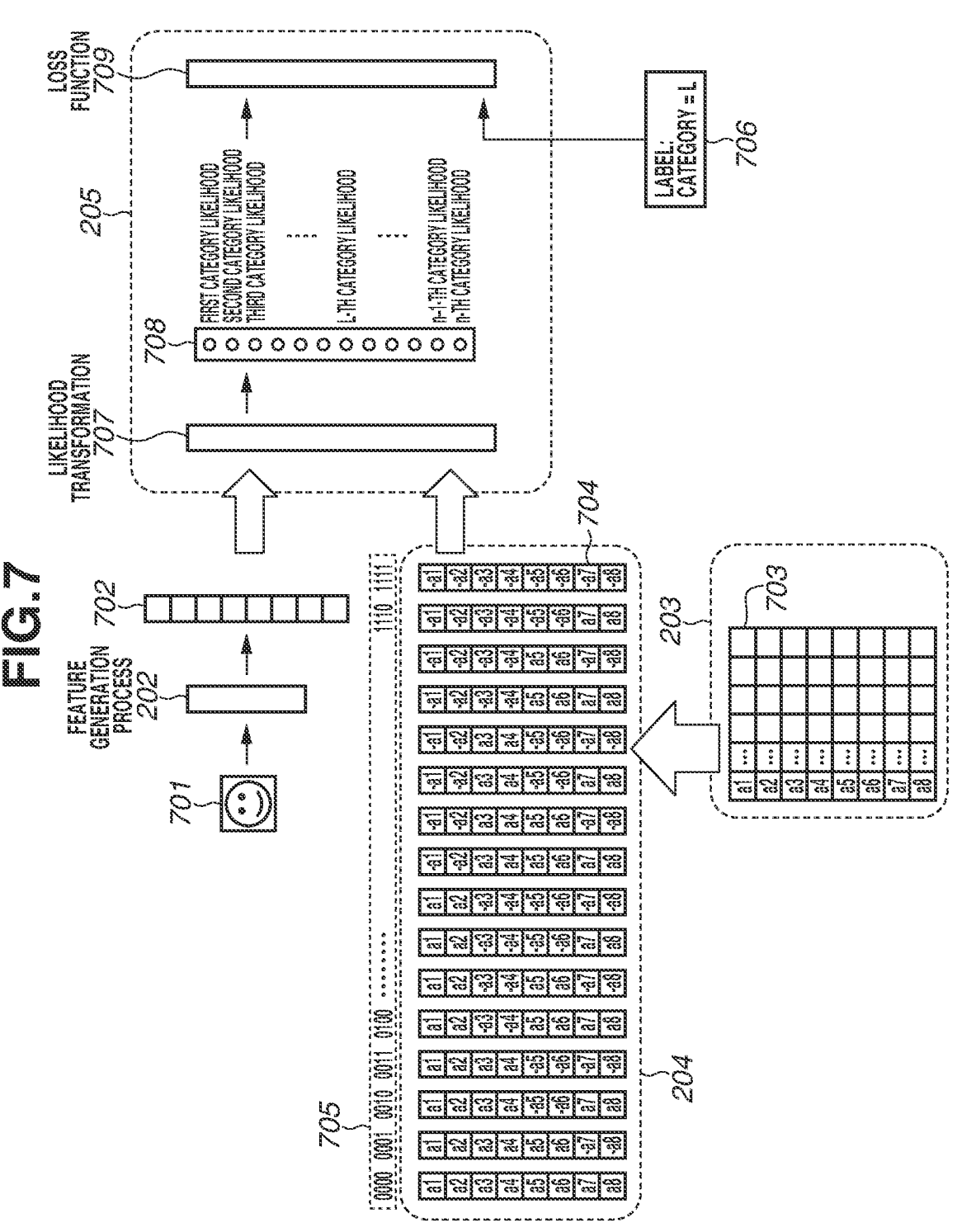
FIG. 7 is a diagram describing another example of the learning process.

FIG. 7 is a diagram describing an example of the learning process in the third exemplary embodiment. Constituent elements 701 to 702 and 706 to 709 illustrated in FIG. 7 respectively correspond to the constituent elements 401 to 402 and 410 to 413 illustrated in FIG. 4. In the learning process of the third exemplary embodiment, the base holding unit 203 holds only a base vector 703, and the representative vector generation unit 204 generates a representative vector 704 by subjecting the elements of the base vector to sign inversion or the like based on sign inversion rules.

FIG. 7 illustrates an example in which the base vector 703 is an eight-dimension vector. A constituent element 705 is a bit string representing the sign inversion rules. In the example illustrated in FIG. 7, four bits are used to represent a sign inversion rule.

In the representative vector generation process, the representative vector generation unit 204 performs sign inversion of the elements of the base vector as expressed by Equation 8 as follows:

$$v_j = \text{sign}\left(\sin\left(\frac{2^{g(j)}b\pi}{2^k}+\frac{\pi}{2^k}\right)\right)e_j \qquad \text{(Equation 8)}$$

In Equation 8, k is the number of bits in a bit string representing the sign inversion rules, b is the bit string representing the sign inversion rules, sign is a function that returns (+1) or (−1) in accordance with the positive or negative sign of the value, $v_j$ and $e_j$ are respective j-th elements of the representative vector and base vector, and g(j) is the number for a group to which the elements j belong. Each group is a set of elements j of which the value of sign in Equation 8 is equal to an arbitrary value of b. The groups are assigned natural numbers up to the number of the groups, as group numbers. In the example illustrated in FIG. 7, the group to which the j-th element from the top (j=natural number of 1 to 8) is expressed by Equation 9 as follows:

$$g(j) = \text{floor}\left(\frac{j+1}{2}\right) \qquad \text{(Equation 9)}$$

In Equation 9, floor is the function for cutoff, which returns the maximum integer number equal to or smaller than the input value.

Unless the distribution of the base vector has a significant imbalance, Equation 8 is approximate to orthogonal transformation with high probability under a sign inversion rule with a sufficiently smaller number of bits than the number of elements of the base vector. That is, in a case where the distribution of the elements of the base vector with (+1) and (−1) element values can be regarded as even and independent with an expected value of about zero, Equation 8 is approximate to orthogonal transformation with high probability under a sign inversion rule with a sufficiently smaller number of bits than the number of elements of the base vector. This transformation may be performed by another method with approximation to orthogonal transformation. The transformation method is not limited to the sign inversion of at least some of elements. For example, the interchange of at least some of elements by changing the order of the elements can obtain similar effects.

The function for determining the groups to which the elements j belong expressed in Equation 9 may be any function. However, for the purpose of approximating Equation 8 to orthogonal transformation, the numbers of elements in the groups are equal in some embodiments. That is, in some embodiments the function can be expressed by Equation 10 below. In addition, Equation 9 can follow the form of Equation 10 by setting d=8 and k=4.

$$g(j) = \text{floor}\left(\frac{k(j+1)}{2}\right) \qquad \text{(Equation 10)}$$

In the third exemplary embodiment, in the parameter learning process, the learning unit 205 can calculate and process the representative vector from the base vector in the process of the loss function 709. As an example, in the case of using the ArcFace loss function discussed by Jiankang Deng et al. as in the first exemplary embodiment, a value L of a loss is expressed by Equation 11 as follows:

$$-\frac{1}{N}\sum_{i=1}^{N} \log \frac{\exp(s\ dir(y_i)\ \cos(\theta_{v(yi)} + m))}{\exp(s\ dir(y_i)\ \cos(\theta_{v(yi)} + m)) +} \qquad \text{(Equation 11)}$$
$$\sum_{k=1}^{2^k} \exp(s\ dir(y_i)\ \cos\ \theta_{v(yi)}) +$$
$$\Sigma_{j \neq yi} \sum_{k=0}^{2^k} \exp(s\ dir(y_i + c)\ \cos\ \theta_{v(j)})$$

In Equation 11, dir is the function for applying one time or −1 time to the elements of the base vector at acquisition of a label (that is, Equation 8 is applied to the elements), and is processed at the same time as the inner product process. The sign k is the bit length of a sign inversion rule. The other indexes are similar to those in the loss function of Equation 7, described above. In the case of adding an integer number to a label, k indicates group transition. For example, as for a label x of a group of "0010", dir(x+1) is processed as the group of "0011".

In the process of approximating to orthogonal transformation in the third exemplary embodiment described above, a vector equivalent to a base vector can be newly generated. Accordingly, it is possible to increase the number of representative vectors that can be generated from the base vectors held by the base holding unit 203 and further reduce the memory usage necessary for the learning of the deep network.

In the exemplary embodiments described above, the target of identity determination is a person's face as an example. However, some embodiments are not limited to this example, and various embodiments can be applicable to any target of identity determination using representative vectors in categories (classes).

According to some embodiments of the present disclosure, it is possible to reduce the memory usage in the process of a deep network using representative vectors.

The above-described exemplary embodiments are all mere examples of carrying out the present disclosure. The technical scope of the present disclosure should not be interpreted in a limited way due to these embodiments. That is, embodiments of the present disclosure can be carried out in various manners without departing from the technical ideas thereof or from the main features thereof.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-120579, which was filed on Jul. 28, 2022 and which is hereby incorporated by reference herein in its entirety.

What is claimed is:

1. An information processing apparatus comprising: one or more processors; and one or more memories that store instructions for causing the one or more processors and the one or more memories to: acquire learning data including first data, second data, a label indicating a first category of the first data, and a label indicating a second category of the second data; hold a plurality of base vectors for generating a first representative vector for the first category and a second representative vector for the second category; learn a plurality of first parameters related to generation of the first representative vector based on the first data and a plurality of second parameters related to generation of the second representative vector based on the second data; generate the first representative vector based on the plurality of first parameters and the plurality of base vectors, and generate the second representative vector based on the plurality of second parameters and the plurality of base vectors; obtain a feature vector; and determine a likelihood that third data from which the feature vector was generated belongs to the first category based on the feature vector and on the first representative vector, wherein a total memory size of the plurality of base vectors is smaller than a total memory size of a plurality of representative vectors that include the first representative vector and the second representative vector, wherein each of the plurality of representative vectors can be generated from the plurality of base vectors.

2. The information processing apparatus according to claim 1, wherein the one or more memories further store instructions for causing the one or more processors and the one or more memories to generate a feature vector based on the first data included in the learning data, and wherein the plurality of first parameters include a parameter related to the generation of the feature vector and the plurality of base vectors.

3. The information processing apparatus according to claim 2, wherein the one or more memories further store instructions for causing the one or more processors and the one or more memories to learn the plurality of first parameters related to the generation of the first representative vector using the learning data, the first representative vector, and the feature vector.

4. The information processing apparatus according to claim 1, wherein the one or more memories further store instructions for causing the one or more processors and the one or more memories to generate unit the first representative vector by linearly combining the plurality of base vectors.

5. The information processing apparatus according to claim 4, wherein the plurality of first parameters are respective weights for linearly combining the plurality of base vectors, and wherein the one or more memories further store instructions for causing the one or more processors and the one or more memories to generate the first representative vector by linearly combining the plurality of base vectors based on the weights for linearly combining the plurality of base vectors.

6. The information processing apparatus according to claim 4, wherein the plurality of base vectors include three or more base vectors.

7. The information processing apparatus according to claim 1, wherein the plurality of base vectors include a first base vector, and wherein the one or more memories further store instructions for causing the one or more processors and the one or more memories to set the first base vector and a vector sign-inverted from the first base vector as the first representative vector.

8. The information processing apparatus according to claim 7, wherein the one or more memories further store instructions for causing the one or more processors and the one or more memories to assign two labels with low degrees of similarity to the first base vector based on an initial degree of similarity calculated based on the learning data.

9. The information processing apparatus according to claim 1, wherein the one or more memories further store instructions for causing the one or more processors and the one or more memories to set a first base vector, of the plurality of base vectors, and a vector in which at least some elements of the first base vector are sign-inverted, as the first representative vector.

10. The information processing apparatus according to claim 1, wherein the one or more memories further store instructions for causing the one or more processors and the one or more memories to set a first base vector, of the plurality of base vectors, and a vector in which at least some elements of the first base vector are interchanged, as the first representative vector.

11. The information processing apparatus according to claim 1, wherein the plurality of first parameters include weights for linearly combining the plurality of base vectors, and wherein each weight of the weights corresponds to a respective base vector of the plurality of base vectors.

12. The information processing apparatus according to claim 11, wherein the one or more memories further store instructions for causing the one or more processors and the one or more memories to generate the first representative vector by linearly combining the plurality of base vectors based on the respective weight that corresponds to each base vector of the plurality of base vectors.

13. The information processing apparatus according to claim 1, wherein the one or more memories further store instructions for causing the one or more processors and the one or more memories to: determine a likelihood that the third data from which the feature vector was generated belongs to the second category based on the feature vector and on the second representative vector.

14. The information processing apparatus according to claim 13, wherein the first data includes the third data.

15. The information processing apparatus according to claim 1, wherein a number of the plurality of base vectors is smaller than a number of categories for which respective representative vectors are generated.

16. An information processing method executed by an information processing apparatus, the information processing method comprising: acquiring learning data including first data, second data, a label indicating a first category of the first data, and a label indicating a second category of the second data; holding a plurality of base vectors for generating a first representative vector for the first category and a second representative vector for the second category; learning a plurality of first parameters related to generation of the first representative vector based on the first data and a plurality of second parameters related to generation of the second representative vector based on the second data; and generating the first representative vector based on the plurality of first parameters and the plurality of base vectors and generating the second representative vector based on the plurality of second parameters and the plurality of base vectors; obtaining a feature vector; and determining a likelihood that third data from which the feature vector was generated belongs to the first category based on the feature vector and on the first representative vector, wherein a total memory size of the plurality of base vectors is smaller than a total memory size of a plurality of representative vectors that include the first representative vector and the second representative vector, wherein each of the plurality of representative vectors can be generated from the plurality of base vectors.

17. A non-transitory computer-readable storage medium that stores computer-executable instructions that, when executed by a computer, cause the computer to: acquire learning data including first data, second data, a label indicating a first category of the first data, and a label indicating a second category of the second data; hold a plurality of base vectors for generating a first representative vector for the first category and a second representative vector for the second category; learn a plurality of first parameters related to generation of the first representative vector based on the first data and a plurality of second parameters related to generation of the second representative vector based on the second data; and generate the first representative vector based on the plurality of first parameters and the plurality of base vectors and generate the second representative vector based on the plurality of second parameters and the plurality of base vectors; obtain a feature vector; and determine a likelihood that third data from which the feature vector was generated belongs to the first category based on the feature vector and on the first representative vector, wherein a total memory size of the plurality of base vectors is smaller than a total memory size of a plurality of representative vectors that include the first representative vector and the second representative vector, wherein each of the plurality of representative vectors can be generated from the plurality of base vectors.

* * * * *